April 19, 1966     F. B. VAZQUEZ     3,246,376
FASTENER ASSEMBLY
Filed Aug. 24, 1964     3 Sheets-Sheet 2
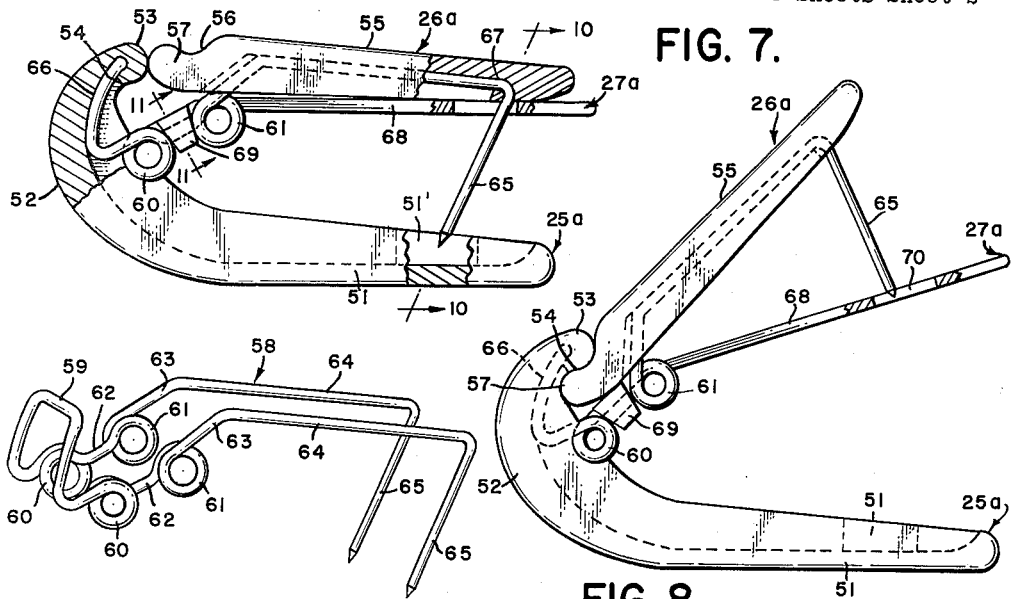
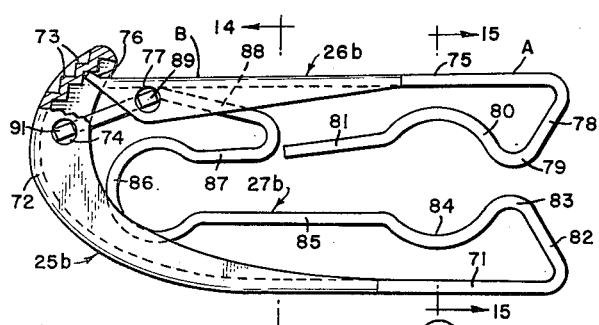
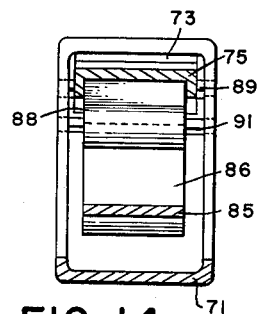
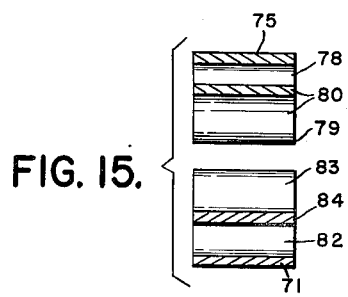
INVENTOR
FRANCISCO B. VAZQUEZ
BY *Garvey & Garvey*
ATTORNEYS April 19, 1966 F. B. VAZQUEZ 3,246,376
FASTENER ASSEMBLY
Filed Aug. 24, 1964 3 Sheets-Sheet 3
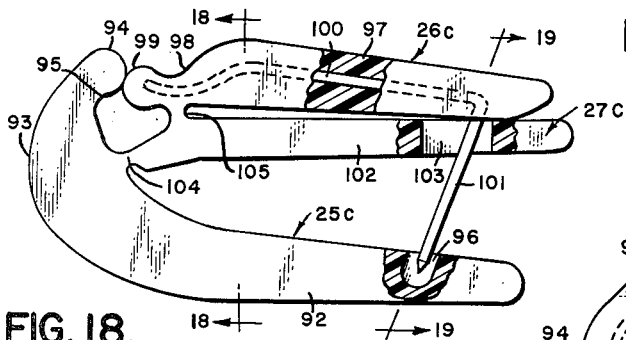
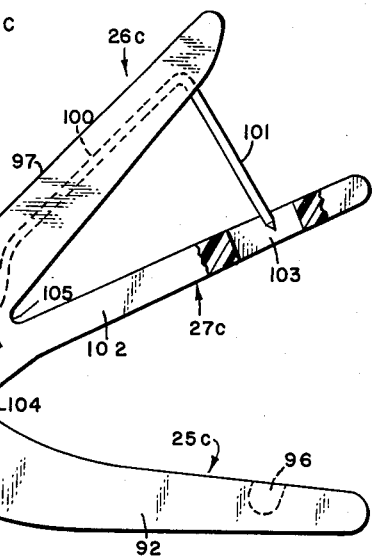
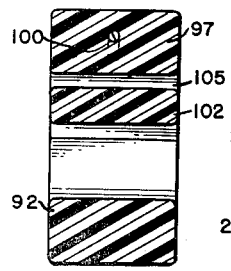
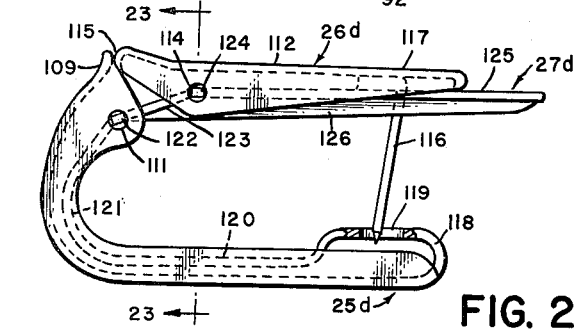
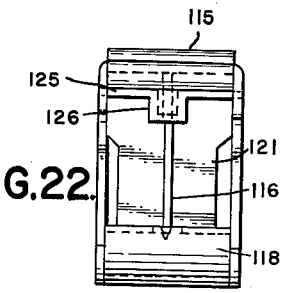
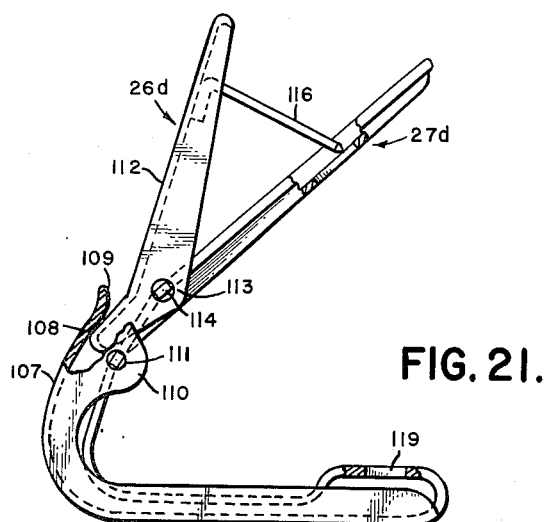
INVENTOR
FRANCISCO B. VAZQUEZ
BY Garvey & Garvey
ATTORNEYS

United States Patent Office 3,246,376
Patented Apr. 19, 1966

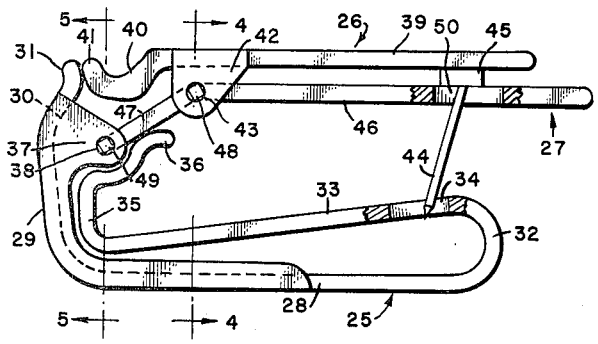

---

3,246,376
FASTENER ASSEMBLY
Francisco B. Vazquez, McLean, Va.
(123 W. Chateau Place, Milwaukee 17, Wis.)
Filed Aug. 24, 1964, Ser. No. 391,417
11 Claims. (Cl. 24—160)

This invention relates to a fastener assembly for securing materials or the like together, such as articles of apparel, and is a continuation-in-part of application Serial Number 164,519, filed January 5, 1962, now abandoned.

It is an object of this invention to provide a fastener assembly comprising a plurality of members relatively movable about plural pivot points, to effect a closing and locking of the fastener assembly, thereby obviating accidental opening of the assembly.

Another object is to provide a fastener assembly including a base member, and a pair of cooperating members pivotally connected to each other, one of said latter members being pivotally connected to the base member, to permit successive movement of said cooperating members about the pivot points, the base member and one of said cooperating members being provided with lips adapted for engagement to retain the fastener assembly in locked position upon movement of the cooperating members about both pivot points.

Other objects are to provide a fastener assembly particularly adapted for securely holding clothing apparel such as diapers, shirt or blouse cuffs, for use as a tie or jewelry clasp, etc., the fastener assembly being opened and closed by a single-handed operation; to provide a fastener assembly including a pin for piercing the materials to be fastened together, the point of the pin being guarded in both the open and closed position; to provide a fastener assembly including means for frictionally engaging and holding materials together, the assembly being provided with means for selectively adjusting the locking position of the assembly to accommodate materials of varying thicknesses; to provide a fastener assembly including spring means for maintaining the components of the assembly in open or closed position, and to provide a fastener assembly of the character described molded of a unitary plastic material.

Other objects of the invention will be manifest from the following description of the present preferred forms of the invention, taken in connection with the accompanying drawings, wherein:

FIG. 1 is a side elevational view of a preferred embodiment of the fastener assembly of the present invention, showing the latter in closed position, portions thereof being broken away to disclose details;

FIG. 2 is a view similar to FIG. 1, showing the assembly in open position;

FIG. 3 is an end elevational view of the fastener assembly of FIG. 1;

FIG. 4 is a sectional view taken along the lines 4—4 of FIG. 1, looking in the direction of the arrows;

FIG. 5 is a sectional view taken along the lines 5—5 of FIG. 1, looking in the direction of the arrows;

FIG. 6 is a fragmentary diagrammatic view illustrating the movement of the component parts of the fastener assembly in opening or closing the same;

FIG. 7 is a side elevational view of a modified form of the present invention, showing the assembly in closed position, portions thereof being broken away to disclose details of construction;

FIG. 8 is a side elevational view of the form of invention illustrated in FIG. 7, showing the assembly in open position;

FIG. 9 is a perspective view of the combination spring and retaining member forming a part of the assembly illustrated in FIGS. 7 and 8;

FIG. 10 is a sectional view taken along the lines 10—10 of FIG. 7, looking in the direction of the arrows;

FIG. 11 is a sectional view taken along the lines 11—11 of FIG. 7, looking in the direction of the arrows;

FIG. 12 is a side elevational view of another modified form of fastener assembly showing the same in closed position, a portion thereof being broken away to disclose details of construction;

FIG. 13 is a side elevational view of the form of invention shown in FIG. 12, showing the latter in open position;

FIG. 14 is a sectional view taken along the lines 14—14 of FIG. 12, looking in the direction of the arrows;

FIG. 15 is a sectional view taken along the lines 15—15 of FIG. 12, looking in the direction of the arrows;

FIG. 16 is a side elevational view of a further modified form of the present invention, showing the latter in closed position, portions thereof being broken away to disclose details of construction;

FIG. 17 is a side elevational view of the form of invention illustrated in FIG. 16, showing the latter in open position;

FIG. 18 is a sectional view taken along the lines 18—18 of FIG. 16, looking in the direction of the arrows;

FIG. 19 is a sectional view taken along the lines 19—19 of FIG. 16, looking in the direction of the arrows;

FIG. 20 is a side elevational view of still another modified form of the present invention, showing the latter in closed position, portions thereof being broken away to disclose details of construction;

FIG. 21 is a side elevational view of the form of invention shown in FIG. 20, showing the latter in open position;

FIG. 22 is an end elevational view of the form of invention illustrated in FIG. 20; and FIG. 23 is a sectional view taken along the lines 23—23 of FIG. 20, looking in the direction of the arrows.

Referring now in greater detail to the form of invention illustrated in FIGS. 1 to 6, the assembly of the present invention includes a base member 25, an upper member 26, and an intermediate member 27 interposed between members 25 and 26. Base member 25 includes a flat elongated section 28, one end of which issues into an upwardly extending portion 29 which, as shown to advantage in FIGS. 1 and 2, is provided with an internal concavely arcuate section 30, the terminal portion thereof being bent to form a lip 31. The opposite end of flat section 28 is bent back upon itself at 32 to provide a superjacent angular flat section 33 having a pin-receiving aperture 34. At a point adjacent upwardly extending portion 29, section 33 is bent upwardly at 35 and thence upwardly and inwardly to form a spring element 36 adapted for contiguous engagement with the underface of intermediate member 27. It will be noted from a consideration of FIGS. 1 and 2, that base member 25 is further provided with a pair of ears 37 which extend inwardly in parallel spaced relation to each other at the locus of arcuate section 30. These ears are preferably formed integrally with upwardly extending portion 29, and are provided with opposed openings 38.

Upper member 26 includes a flat elongated section 39, one terminal of which is arcuately formed at 40 and issues into an upturned lip 41 adapted for engagement with lip 31 when the assembly is in the closed position indicated in FIG. 1. Lip 41 is adapted for engagement with arcuate surface 30 of base member 25 when in the open position illustrated in FIG. 2. Flat elongated section 39 is provided, at a point adjacent arcuate portion 40, with depending ears 42, preferably formed integrally with the section, which ears are in parallel spaced relation and are provided, near their terminals, with opposed openings 43. A pin 44 is fixed at 45 to the underface of section 39.

Intermediate member 27 includes a flat elongated section 46 which, as shown in FIG. 1, is substantially in parallel spaced relation to upper member 26 when the fastener assembly is in the closed position. The innermost portion of section 46 is bent downwardly at an angle, as indicated at 47, the limits of which downwardly extended portion are provided with lateral pins 48 and 49, formed integrally therewith, which pins are adapted for insertion into ear openings 43 and 38 respectively. It is further noted that spring member 36 of base member 25 is in constant engagement with the underface of angular portion 47, thereby exerting a constant upward tension on intermediate member 27. Intermediate member 27 is further provided with a strategically positioned opening 50 through which pin 44 passes for retaining engagement with an article placed between intermediate member 27 and base member 25.

FIG. 6 diagrammatically illustrates the operation of the assembly of the present invention in closing or opening the same. In moving upper and intermediate members 26 and 27 to the closed position from the position shown in FIGURE 2, it will be noted that members 26 and 27 first rotate about the center of opening 38 as a pivot point, at which time the tip of lip 41 is in contact with arcuate surface 30, describing an arc of a circle, designated a, the center of which is the central point of opening 38. During this period, the convex surface of arcuately formed portion 40 is in engagement with the upper face of angular portion 47 of intermediate member 27. After the tip of lip 41 has passed through the arc, lip 41 slides up to the locked position by the lever action of upper member 26, about the center of opening 43 as a pivot point, as shown in full lines in FIG. 6. It will also be noted from FIG. 6, that the angle of aperture a' traversed by angular portion 47 about the center of opening 38 is the same as the arc of the angle traveled by lip 41 until it is not restricted by arcuate surface 30. Between the full open and full closed positions, members 26 and 27 are separated at a constant angle conveniently determined by the degree of bend of part 47 with respect to part 46.

It will be noted from a consideration of FIGS. 1 and 2, that in the open position, the point of pin 44 is guarded by intermediate member 27 and in the closed position, is guarded by section 33 of base member 25.

In use of the fastener assembly, the fastener is opened by placing a finger between the free terminals of members 26 and 27, and pushing the latter down slightly, forcing the former upwardly and freeing lip 41 from engagement with lip 31. The tension of spring 36 then forces members 26 and 27 upwardly about the center of opening 38 as the pivot point so that the fastener assembly assumes the position shown in FIG. 2. The material to be fastened, such as wearing apparel, including diapers, shirt or blouse cuffs, etc., are placed between intermediate member 26 and base member 25. A downward pressure on member 26 forces pin 44 through the material into opening 34 of base member 25, during which period lip 41 moves to the spring-locked position shown in FIG. 1 in the manner described supra. In this closed position, the fastener assembly cannot be accidentally opened, because of the positive locking action afforded by the present arrangement of assembly parts.

In FIGS. 7 to 11 there is illustrated a modified form of the present assembly which includes a base member 25a, an upper member 26a and an intermediate member 27a. Base member 25a is of substantially channel shape and includes a body section 51, one end of which issues upwardly into an arcuate section 52 terminating in a lip 53. Subjacent lip 53, arcuate section 52 is inset and of concave conformation, to form a lip-receiving recess 54.

Upper member 26a is also generally channel shape and includes a body section 55, one terminal of which is formed to provide a lip-receiving recess 56 which issues into a lip 57.

It is a salient feature of this form of the invention to provide a combination spring and pivot member 58 which is shown to advantage in FIG. 9. Spring and pivot member 58 includes an arched U-shaped portion 59, each leg of the U issuing into opposed wire loops 60 and 61, which are spaced by a connecting portion 62. Adjacent loops 61, the spring and pivot member issues upwardly and rearwardly at an angle, as indicated at 63, to the main body portion of the member 64 which extends rectilinearly through a substantial portion of the member. The terminals of the member are then bent downwardly to form opposed pins 65. Referring now to FIG. 7, spring and pivot member 58 may be embedded or attached to base member 25a and upper member 26a along the surfaces designated 66 and 67 respectively.

Intermediate member 27a includes a substantially flat elongated body section 68, one end of which extends between opposed loops 61 of spring and pivot member 58. The terminal portion of body section 68 is laterally extended to form flange portions 69 adapted to be wrapped around connecting portion 62 of member 58, in the manner illustrated in FIG. 11, in order to retain the intermediate member in proper position for operation. The opposite terminal of body section 68 is provided with a pair of openings 70, adapted to permit the passage of pins 65 through intermediate member 27a.

The operation of the fastener assembly illustrated in FIGS. 7 through 11 is similar to that described above in connection with the form of invention illustrated in FIGS. 1 through 6. It will be noted that wire loops 60 and 61 serve both as pivot points and springs, to effect locking and unlocking of the fastener assembly. As shown in FIG. 7, when the fastener assembly is in locked position, lips 53 and 57 of base member 25a and upper member 26a respectively, are in contiguous engagement and the points of pins 65 lie within channel-shaped body section 51. When the fastener is opened by rotation of upper member 26a and intermediate member 27a about pivot loops 60 and 61, lip 53 engages lip-receiving recess 56 and lip 57 engages lip-receiving recess 54, to limit the degree of opening of the fastener, so that the points of pins 65 are guarded within openings 70 of intermediate member 27a. In closing the fastener assembly, pressure is merely exerted downwardly on upper member 26a to rotate said member and intermediate member 27a about pivot loops 60 and 61, against the spring tension of member 58, until lips 53 and 57 are engaged as shown in FIG. 7.

In FIGS. 12 through 15, there is illustrated another modified form of the present invention, adapted to frictionally engage and hold the material, rather than pierce the same with pins, in order to retain the same. This form of fastener assembly employs basically the same components, operating in the same manner, as other forms of the invention, and incudes a base member 25b, an upper member 26b and an intermediate member 27b. Base member 25b preferably includes a body section 71, a portion of which is flat and a portion of which is of channel shape, the latter portion extending upwardly to form an arcuate channel section 72, the central portion of which terminates in a series of notches 73. Subjacent notches 73, the opposed lateral portions of channel section 72 are provided with openings 74. Upper member 26b includes a rectilineal body section 75, a portion of which is flat and the major portion of which is of channel shape. That portion of body section 75 adjacent arcuate section 72 of base member 25b, is upwardly turned at its terminal, to form a lip 76 adapted for selective engagement with notches 73. Opposed openings 77 are located in the lateral portions of the channel section of body 75.

It will be noted from FIGS. 12 and 13 that the opposite terminal of body section 75 is bent downwardly and inwardly at 78 to form a neck portion 79 which issues into an arcuate material-engaging surface 80, from which a terminal portion 81 extends to a point adjacent intermediate member 26b.

In this form of invention, intermediate member 27b is preferably formed integrally with base member 25b and includes an upwardly and inwardly extending portion 82, connected to a neck portion 83 which is in opposed relation to neck portion 79 of upper member 26b, when the assembly is in the closed position illustrated in FIG. 12. Also, as viewed in this closed position, the intermediate member includes an arcuate material-engaging surface 84 which is complemental to, and in opposed relation to, material-engaging surface 80 of upper member 26b. From this point, intermediate member 27b includes a rectilineal portion 85 which extends to a point adjacent arcuate channel section 72 of base member 25b, at which point it is coiled, at 86, and issues into a portion 87 extending in the opposite direction from portion 85, to a point adjacent the terminal 81 of upper member 26b, at which point it extends rearwardly at an angle, as indicated at 88, within the channel portion of body section 75. At the locus of openings 77, member 27b is provided with ears 89 which extend into the openings and a connecting section 90, the terminal of which is laterally extended to provide ears 91 for engagement in openings 74.

Coil 86 serves to permit attachment of the fastener to a clothes hanger, clothes line, etc. When the fastener is in the open position shown in FIG. 13, engagement of the hanger with the inner periphery of coil 86 is facilitated. Upon closing the fastener, as shown in FIG. 14, the coil exerts a tighter grip on the hanger, preventing accidental disengagement from the fastener assembly.

The manner of operation of the fastener assembly of this form of the invention is substantially the same as that described above in connection with the forms of invention illustrated in FIGS. 1 through 11. However, in this form of the invention, the material to be held is placed between arcuate material-engaging surfaces 80 and 84, when the fastener is in the open position shown in FIG. 13. For closing the fastener assembly, upper member 26b is pressed downwardly at point A. This causes upper member 26b to pivot about the center of openings 77 and intermediate member 27b to pivot about the openings 74, thereby permitting lip 76 to be freed from the lowermost notch 73 and be moved upwardly until the material between arcuate material-engaging surfaces 80 and 84 is firmly held and prevented from casual displacement by virtue of the frictional engagement of proximate neck portions 79 and 83. The particular notch engaged by lip 76 will, of course, depend upon the thickness of the material being clasped.

In order to open the fastener assembly, pressure is exerted at point B to permit disengagement of lip 76 from notch 73 against the tension of the spring portion of intermediate member 27b, allowing the rotation of upper member 26b about the double pivot points, to open the fastener assembly to the position shown in FIG. 13.

In FIGS. 16 through 19, there is illustrated a fastener assembly constructed in accordance with the present invention, which is a unitary product molded of plastic in polypropylene such as Eastman's Tenite or an acetal resin such as Dupont's Delrin. Any other suitable plastic having the flexing properties of Tenite or Delrin may also be employed. The fastener of this form of the invention includes a base member 25c, an upper member 26c and an intermediate member 27c. Base member 25c includes a body section 92, one terminal of which is extended upwardly to form an arcuate portion 93 which terminates in a lip 94. Subjacent lip 94, the inner surface of arcuate section 93 is arcuately formed to provide a lip-receiving recess 95, near the opposite terminal of body section 92 and is provided with a pin-receiving recess 96. Upper member 26c includes a body portion 97 which issues into a lip-receiving recess 98 and terminates in a lip 99. A wire 100 extends longitudinally through body section 97 to a point adjacent one end thereof, where it is bent downwardly to form a retaining pin 101.

Intermediate member 27c includes a body section 102 which is provided with an opening 103 to permit passage of pin 101 therethrough. Near its opposite end, body section 102 is reduced in thickness at 104, at the point of connection with arcuate section 93 of base member 25c and is also reduced at 105 at the point of connection with upper member 26c. This reduced thickness provides a flexibility permitting relative movement of the members at these points, in the same manner as the double pivots of the forms of invention illustrated in FIGS. 1 through 15.

The manner of operation of this form of the invention is the same as that illustrated above, and is particularly similar in operation to the form of invention illustrated in FIGS. 7 through 11.

In FIGS. 20 through 23, there is illustrated another modified form of the present invention which is similar to that illustrated in FIGS. 1 through 6, but wherein the base member and intermediate member, including spring, are of unitary construction. This form of the invention includes a base member 25d, an upper member 26d and an intermediate member 27d. Base member 25d is of channel shape construction and includes a body section 106, one terminal of which extends upwardly to form an arcuate portion 107. Arcuate portion 107 is provided with an internal lip-engaging surface 108 and terminates in a lip 109. The lateral extremities of channel-shaped arcuate portion 107 are enlarged to form ears 110 having opposed openings 111.

Upper member 26d is of channel shape and includes a body section 112, the extremities of which are enlarged at 113 and provided with opposed openings 114. At a point adjacent one end thereof, body section 112 issues upwardly to form a terminal lip 115 adapted for engagement with lip 109 of base member 25d when the fastener assembly is in the closed position illustrated in FIG. 20. A retaining pin 116 is secured to the underface of body section 112 in any suitable manner as indicated at 117.

As also indicated above, intermediate member 27d is formed integrally with base member 25d and includes a flat section 118 which is bent upwardly and inwardly of the fastener assembly, which portion is in spaced relationship to body section 106 of base member 25d and is provided with a pin opening 119. Adjacent pin opening 119, flat section 118 is narrowed and extends downwardly to form a spring element 120 lying within the confines of channel-shaped body section 106 which element is curved, as indicated at 121 to complement arcuate portion 107 of the base member, as indicated in FIG. 20. Curve portion 121 is extended laterally to provide ears 122 extending through openings 111 of the base member. An angular connecting section 123 extends from ears 122 to a second set of ears 124 which lie within openings 114. A portion 125 extends rearwardly from ears 124 to a point beyond body section 112 of upper member 26d and in substantially parallel relationship thereto, when in the position shown in FIG. 1. A reinforcing rib 126 is stamped out of portions 123 and 125, as shown in FIGS. 22 and 23.

The opening and closing of the fastener assembly of the form of invention illustrated in FIGS. 20 through 23 is substantially the same as that above described in connection with the form of invention illustrated in FIGS. 1 through 6.

All of the above described forms of the present invention are operable by a single-handed operation of the user, thereby leaving the other hand free for holding the materials to be secured together. Although the present fastener assembly is particularly adapted as applied to articles of apparel such as diapers, shirt and blouse cuffs; for use as a tie or jewelry clasp or the like, it is to be understood that it has many other applications for fastening articles together.

While there has been herein shown and described, preferred forms of the present invention, it is to be understood that the same has been done for purposes of illustration only, and that various changes may be made therein, without departing from the spirit and scope of the claims hereto appended.

What is claimed is:

1. A fastener assembly including a base member, one end of said base member extending upwardly to form an arcuate section terminating in a lip, an upper member, one terminal of which issues into a lip adapted for abutting engagement with the lip of said base member when the fastener assembly is in the closed position, and for engagement with the inner surface of said arcuate section when the assembly is in the open position, an intermediate member between said upper member and said base member, means pivotally connecting a terminal of said intermediate member to said base member at the locus of said arcuate section, means pivotally connecting said upper member to said intermediate member, and a pin secured to, and depending from said upper member.

2. The fastener assembly of claim 1, with the addition of a spring member carried by said base member and in engagement with said intermediate member, for urging said intermediate and upper members to the open position.

3. The fastener assembly of claim 1, with the addition of a spring member extending from said intermediate member and formed integrally with said base member, for urging said intermediate and upper members to the open position.

4. The fastener assembly of claim 1, wherein said pin passes through said intermediate member, said upper and intermediate members being separated and fixed at a constant angle while rotating about said means pivotally connecting said intermediate and base members, when the assembly is being opened, the point of said pin being uniplanar with said intermediate member in the open position to guard the pin point.

5. A fastener assembly comprising a base member having outer and inner ends, said base member including a pin-receiving looped guard-member formed adjacent its outer end adapted to receive and guard the pin point when the assembly is in closed position, an upper member and an intermediate member, each member having outer and inner ends, means for pivotally connecting said upper member and intermediate member adjacent the inner ends thereof, said upper and intermediate members being operatively hinged to said base member adjacent their inner ends to join the base and the upper and intermediate members together and to permit opening and closing of the assembly, a pin fixed in the upper member adjacent its outer end, the intermediate member being arranged, adjacent its outer end, to guard the point of said pin when the assembly is in open position, an upstanding lip portion formed at the inner end of the base member, and a similar and complementary upstanding lip portion formed at the inner end of the upper member, said lip portions being arranged in abutting stop relation when the device is closed and adapted to be moved out of such abutting relation when the device is open.

6. A fastener assembly, as set out in claim 5, wherein the intermediate member is operatively connected by hinge means to the base member and the upper member is operatively connected by hinge means to the intermediate member.

7. A fastener assembly, as set out in claim 5, wherein the intermediate member is operatively connected by hinge means at its inner end to the inner end of the base member, the lip portion of the upper member being in close abutting contact with the lip portion of the base member when the assembly is closed in a manner to resist opening of the device and arranged to follow the underside of the lip portion of the base member when the assembly is being opened or closed, and means to maintain said lip portion of the upper member in constant close sliding contact with the under side of the lip of the base member during the opening and closing of the assembly.

8. A fastener assembly, as set out in claim 5, wherein the intermediate member is operatively connected by hinge means at its inner end to the inner end of the base member, the lip portion of the upper member being in close abutting contact with the lip portion of the base member when the assembly is closed in a manner to resist opening of the assembly and arranged to follow the under side of the lip portion of the base member when the assembly is being opened or closed, and means to maintain said lip portion of the upper member in constant close sliding contact with the under side of the lip of the base member during the opening and closing of the assembly, the under side of the lip of the base member being formed in the arc of a circle.

9. A fastener assembly as set out in claim 5, wherein the intermediate member is operatively connected by hinge means at its inner end to the inner end of the base member, the lip portion of the upper member being in close abutting contact with the lip portion of the base member when the assembly is closed in a manner to resist opening of the assembly, and arranged to follow the under side of the lip portion of the base member when the assembly is being opened or closed, means to maintain said lip portion of the upper member in constant close sliding contact with the under side of the lip of the base member during the opening and closing of the assembly, and means for limiting the degree of opening of the assembly.

10. A fastener assembly including a base member, a terminal of said base member issuing upwardly to form a lip, an upper member, one terminal of which issues into a lip adapted for abutting engagement with the lip of said base member, when the fastener assembly is in locked position, a combination spring and pivot member interposed between said base member and said upper member, said combination spring and pivot member including an arched U-shaped portion secured to said base member, each leg of said U-shaped portion issuing into opposed wire loops, a main body portion extending rearwardly from said wire loops, said main body portion being secured to said upper member, pins depending from said main body portion, and an intermediate member interposed between said base member and said upper member, said intermediate member being fixed to said combination spring and pivot member.

11. A fastener assembly including a base member, one end of said base member issuing upwardly in an arc and provided with a terminal series of notches, the opposite terminal of said base member being formed to provide a material-engaging surface, an upper member, one terminal of which issues into a lip adapted for selective abutting engagement with the notches of said base member, when the fastener assembly is in closed position, the opposite terminal of said upper member being formed to provide a material-engaging surface in opposed relation to the material-engaging surface of said base member, a combination spring and pivot member issuing from said base member, means for pivotally connecting said spring and pivot member to said base member, and means for pivotally connecting said spring and pivot member to said upper member.

References Cited by the Examiner

UNITED STATES PATENTS

| | | | |
|---|---|---|---|
| 479,938 | 8/1892 | Fredlihp | 24—248 |
| 897,976 | 9/1908 | Germann | 24—160 |
| 2,667,676 | 2/1954 | Sampson | 24—160 |
| 2,671,256 | 3/1954 | Duke | 24—160 |
| 2,828,518 | 4/1958 | Robertson | 24—49 |
| 3,058,186 | 10/1962 | Fanning | 24—250 X |
| 3,149,386 | 9/1964 | Trundy | 24—157 |

FOREIGN PATENTS

| | | |
|---|---|---|
| 1,159,796 | 7/1938 | France. |
| 23,743 | 10/1910 | Great Britain. |

WILLIAM FELDMAN, *Primary Examiner.*

D. GRIFFIN, *Assistant Examiner.*